United States Patent Office 3,487,096
Patented Dec. 30, 1969

3,487,096
NITROGEN CONTAINING ORGANOGERMANIUM COMPOUNDS
Wolfgang H. Eisenhuth, University City, Kurt Moedritzer, Webster Groves, and John R. Van Wazer, Ladue, Mo., assignors to Monsanto Company, St. Louis, Mo., a corporation of Delaware
No Drawing. Filed June 12, 1967, Ser. No. 645,479
Int. Cl. C07f 7/00; A01n 9/20
U.S. Cl. 260—429                          10 Claims

ABSTRACT OF THE DISCLOSURE

The organic germanium compounds have the general over-all composition $$Ge[(NQ_{1/2})_xX_y$$

where $x+y=4$. In the above formula Q is a hydrocarbyl radical of from 1 to 20 carbon atoms including both alkyl and aromatic radicals, X is a radical selected from the group consisting of halogens such as fluorine, chlorine, bromine and iodine, alkoxy radicals, OR, dialkyl amine radicals, $NR_2$ and mercapto radicals, SR, where R is an alkyl radical having from 1 to 20 carbon atoms. The present compounds are prepared from $$GeX_4 + NQY$$

where
(1) $Y=H_2$
(2) $Y=Ge/2$
(3) $Y=GeX_2$ yielding products having biological activity such as insecticides, fungicides and herbicides, and as a catalyst and a source of pure germanium.

---

The present invention relates to novel substituted germanium nitrogen compounds. It is an object of the invention to prepare certain novel compounds containing germanium and nitrogen, and existing either as simple low molecular weight compounds or as polymeric compounds.

It is also an object of the invention to provide certain germanium nitrogen compounds having biological activity such as insecticides, fungicides and herbicides, and as a catalyst and a source of pure germanium.

The compounds contemplated in the present invention have the general overall composition $$Ge[(NQ)_{1/2}]_xX_y$$

where $x+y=4$. In the above formula Q is a hydrocarbyl radical of from 1 to 20 carbon atoms including both alkyl and aromatic radicals, X is a radical selected from the group consisting of halogens such as fluorine, chlorine, bromine and iodine, alkoxy radicals, OR, dialkyl amine radicals, $NR_2$ and mercapto radicals, SR, where R is an alkyl radical having from 1 to 20 carbon atoms.

The general reactants for the preparation of the compounds of the present invention are $$GeX_4 + NQY$$

In these reactants:
(1) $Y=H_2$
(2) $Y=Ge/2$
(3) $Y=GeX_2$ and with the mixture at a temperature in the range of from $-80°$ C. to $250°$ C. A solvent is not necessary, although it is more convenient to operate in the presence of a hydrocarbon solvent, e.g., benzene, toluene or decane solvent or a halocarbon solvent such as carbon tetrachloride. The pressure may be maintained at the desired level for vacuum or pressure conditions, and may be carried out in a sealed tube or under an inert gas atmosphere for example nitrogen or argon.

The products of the invention are separated from the reaction mixture by vacuum distillation, crystallization, sublimation or chromotography.

One specific method in accordance with the first equation above is by the reaction of $GeX_4$ with $H_2NQ$.

The molar ratio between the starting components, e.g., $GeX_4$ and the modifying $H_2NQ$ is broadly in the proportion of from 100:1 to 1:100, with certain preferred ratios having been discovered for the obtainment of predominantly linear, cyclic or branched products as set forth below.

The general classes of specific products obtained in the practice of the present invention, and falling within the above general formula, with the central (NMe) or more generally, the NQ radical existing as a linear or chain structure are as follows:

Dimer

```
 X    Q    X
  \   |   /
   Ge–N–Ge
  /        \
 X          X
```

Linear polymer

```
 X    Q  ⎡ X  Q ⎤      X
  \   |  ⎢  |  | ⎥     /
   Ge–N– ⎢ –Ge–N– ⎥  –Ge
  /      ⎣   |    ⎦n    \
 X           X           X
```

Linear polymer with 3-way branches (e.g., germanium connected to 3 nitrogen bridges)

```
 X    Q  X  Q  X  Q  X  Q        X
  \   |  |  |  |  |  |  |       /
   Ge–N–Ge–N–Ge–N–Ge–N–Ge
  /      |     |     |     \
 X       N–Q   X     X      X
         |
         Ge
        /|\
       X X X
```

Linear polymers with 4-way branches

```
     X X X   X X X
      \|/     \|/
       Ge      Ge
       |       |
 X     Q  N–Q  Q  N–Q  Q   X    Q      X
  \    |  |    |  |    |   |    |     /
   Ge–N–Ge––––N–Ge––––N–Ge–N–Ge
  /       |       |       |        \
 X        X       N–Q     X         X
                  |
                  Ge
                 /|\
                X X X
```

Rings

```
    X   X
     \ /
      Ge
     /  \
  Q–N    N–Q
   |      |
  X \    / X
     Ge  Ge
    / \  / \
   X   N    X
       |
       Q
```

Rings with 3-way branches

```
    X   X
     \ /
      Ge
     /  \
  Q–N    N–Q
   |      |
  X \    /         X
     Ge  Ge––N––Ge
    / \  /         \
   X   N  X         X
       |
       Q
```

Rings with 4-way branches

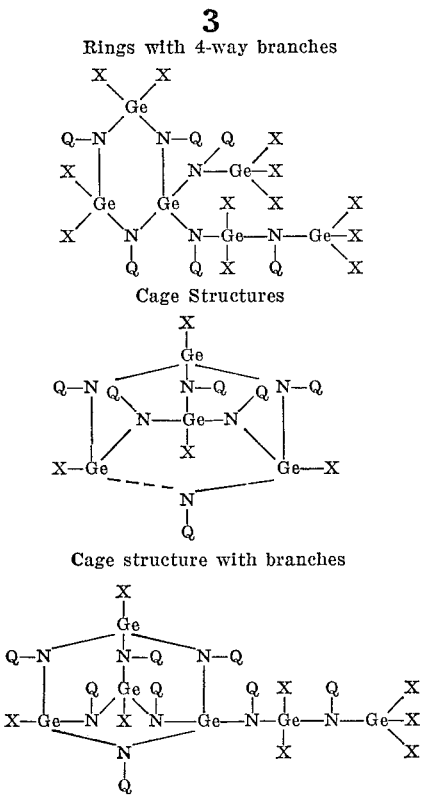

Cage Structures

Cage structure with branches

Another general procedure for the preparation of the present compounds is to mix the respective components for example the compound Ge(NQ)$_2$ together with GeX$_4$ such as germaniumtetrachloride in the desired molar proportion, broadly 100:1 to 1:100, for example 1:10. Depending on the equilibrium composition desired, from 0.13 g. to 1.3 g. of germaniumdimethylimide and from 4.2 g. to 0.21 g. of germaniumtetrachloride, e.g., a ratio of 1 to 10 moles of germaniumdimethylimide versus 20:1 moles of germaniumtetrachloride are accurately weighed into 5 mm. I.D. thick-walled Pyrex tubes which are previously kept in an oven to remove sorbed water and are then flushed with pure, dry nitrogen. The tubes are sealed and then heated for 80 hrs. at 150° C. The contents of each tube are completely homogeneous under these conditions. After heating, the tubes are rapidly cooled at 0° C., and a portion of the contents is transferred directly into a precision-bore, thin-walled tube, together with enough benzene for dissolving, and investigated by proton nuclear magnetic resonance (for Q being methyl groups). The system is found to attain equilibrium upon dissolution of the Ge(NQ)$_2$.

A third general procedure for preparing the species dimer and linear polymers is to react a ring species [X$_2$GeNQ]$_n$ such as [X$_2$GeNQ]$_3$ with GeX$_4$ in the mole proportion of 100:1 to 1:100, at temperatures between 80° C. and 250° C. The starting [X$_2$GeNQ]$_n$ has a value of $n$ from 3 to 5.

The following examples illustrate specific embodiments of the present invention:

Example 1

Twenty g. GeCl$_4$ are placed in 1 lt. three-necked flask with 500 ml. Na-dried ether. While cooling with ice water, 5.9 g. dry NH$_2$Me is bubbled in, with moderate stirring. Then, the mixture is refluxed for 20 hrs. in the reacting proportions of 1 mole proportion of GeCl$_4$ with 3 mole proportions of CH$_3$NH$_2$. The liquid is separated by suction from the NH$_2$Me·HCl precipitate and evaporated to give 10 g. of crude product (M.P. 100–120° C.) corresponding to a 61% yield. After four recrystallizations from ether at low temperatures (down to −80° C.), there result white colorless needles (M.P. 132.5–135.5° C.).

*Analysis.*—Calc. for [Cl$_2$GeNMe]: H, 1.75; C, 6.86; N, 8.12; Cl, 41.10; Ge, 42.07. Found: H, 1.84; C, 7.14; N, 8.27; Cl, 41.35; Ge, 41.82. Molecular weight from cryoscopy: 495.0. Calc. for [Cl$_2$GeNMe]$_3$: 517.7.

The compound is therefore a trimeric cyclic molecule having a six-atom backbone of alternating Ge and N atoms.

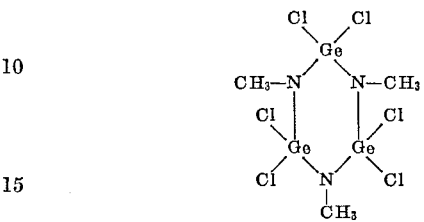

The NMR shift for the protons of the NCH$_3$ group in this compound is −2.625 p.p.m. (ref. tetramethylsilane) for a 24.4 wt. percent solution in benzene.

The [Cl$_2$GeNMe]$_3$ is very soluble in all common solvents such as benzene, ether, CS$_2$, CCl$_4$, CHCl$_3$, petroleum ether, and dioxane.

Example 2

A second method for the preparation of the above compound based upon germanium methylimide is made in a manner similar to that described for the preparation of the ethylimide. Excess methylamine is blown into a rapidly stirred solution of germanium tetrachloride in ether at 0° C. The liquid is separated from the precipitate of the amine hydrochloride and evaporated to yield a colorless, glassy-looking substance which cannot be redissolved even after heating with the solvent for 14 days at 140° C. The amorphous material thus formed is [Ge(NMe)$_2$]$_n$ still containing some N—H bonds. This substance is heated with the stoichiometric proportion of GeCl$_4$ e.g. 1 mole proportion of GeCl$_4$ with 3 mole proportions of the amine radical, for three days at 120° C. in a sealed tube to give a slightly yellow-to-orange melt. After dissolution in dry ether, this melt yields the compound [Cl$_2$GeNMe]$_3$ in colorless needles upon recrystallization.

Example 3

A quantity of 7.4 g. of (Cl$_2$GeNMe)$_3$ (the ring species) is mixed with 64.2 g. GeCl$_4$ and heated in a sealed tube for 80 hrs. at 160° C. The reaction products contain 82% of Cl$_3$GeNMeGeCl$_3$. Another method of obtaining the same product is by mixing together and heating together one molar proportion of GeCl$_4$ with 0.36 molar proportion of CH$_3$NH$_2$, and thereafter separating the product.

Example 4

A quantity of 5.2 g. of (Cl$_2$GeNMe)$_3$ is mixed with 7.5 g. GeCl$_4$ and 30 ml. benzene and heated to 50° C. for 10 hrs. in a sealed tube. The reaction products contain 56% Cl$_3$Ge[NMeGeCl$_2$]$_2$NMeGeCl$_3$.

Example 5

A quantity of 21.4 g. GeCl$_4$ and 12.4 g. NH$_2$Me in 20 ml. benzene are brought together at −80° C., sealed in a tube, thawed and thoroughly mixed. Then after heating at 160° C. for 24 hrs. the tube is opened, the solution separated from the precipitate of MeNH$_2$·HCl. The liquid of the overall composition Ge(NMe)$_{1.33}$Cl$_{1.33}$ contains mainly the cage species besides considerable amounts of the linear and ring, ring-branch, branch and cage-branch species.

Example 6

A quantity of 21.4 g. GeCl$_4$ and 14.0 g. NH$_2$Me in 20 ml. benzene are mixed together at −80° C., sealed in a tube, thawed and thoroughly mixed. After heating to 160° C. for 24 hrs. the tube is opened and the solution separated from the precipitate of MeNH$_2$·HCl. The liquid of the overall composition Ge(NCH$_3$)$_{1.5}$Cl contains mainly branched and cage-branched species.

Example 7

A quantity of 39.2 g. GeBr$_4$ and 9.3 g. Ge(NMe)$_2$ are placed in a sealed tube and heated for 48 hrs. to 160° C. The obtained solid consists mainly of the ring species and has the overall composition [Br$_2$GeNMe]$_n$.

Example 8

A quantity of 14.9 g. GeF$_4$ are condensed at −80° C. on 9.3 g. NH$_2$Me in 20 ml. of benzene. The tube is sealed and carefully thawed and after thorough shaking is heated to 100° C. The reaction product of the overall composition GeF$_2$(NMe) consists mainly of ring and chain species.

Example 9

A quantity of 13.0 g. Ge(NMe)$_2$ and 19.7 g.

Ge(OMe)$_4$ are mixed together and heated to 120° C. in a sealed tube for 50 hrs. The resulting products of the overall composition [(OMe)$_2$GeNMe]$_n$ consist of chain and ring species.

Example 10

A quantity of 1.87 g. Ge(i-prN)$_2$ and 15.66 g.

Ge(SMe)$_4$ are mixed together, sealed in a tube and heated to 140° C. for 60 hrs. The reaction product has the overall composition (SMe)$_3$Ge(N i-pr)$_{0.5}$.

Example 11

A quantity of 2.55 g. Ge(NC$_6$H$_5$)$_2$ and 2.49 g.

Ge(NMe$_2$)$_4$ are mixed together, sealed in a tube and heated to 130° C. for 80 hrs. The reaction product of the overall composition (NMe$_2$)$_2$GeNC$_6$H$_5$ contains mainly the ring and chain species.

Example 12

A quantity of 5.8 g. GeI$_4$ are mixed with 1.6 g.

Ge(NEt)$_2$ together in 10 ml. benzene and heated in a sealed tube at 90 C. for 100 hrs. The reaction product of the overall composition I$_2$GeNEt consists mainly of the ring and chain species.

In the above examples, the term "Me" designates the methyl group, —CH$_3$, "i-pr" indicates the isopropyl group —CH(CH$_3$)$_2$, while "Et" indicates the ethyl group, C$_2$H$_5$.

What is claimed is:

1. Germanium compounds having the formula

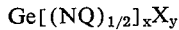

where $x$ and $y$ are numbers greater than zero, and less than 4, and where $x+y=4$, Q is a hydrocarbyl radical of from 1 to 20 carbon atoms, X is selected from the group consisting of fluorine, chlorine, bromine, iodine, alkoxy radicals, dialkyl amine radicals, and mercapto radicals, wherein the alkyl radical has from 1 to 20 carbon atoms.

2. The compound

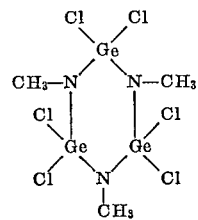

3. The compound

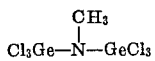

4. Process for the preparation of compounds having a formula

where $x$ and $y$ are numbers greater than zero, and less than 4, and where $x+y=4$, Q is a hydrocarbyl radical of from 1 to 20 carbon atoms, X is selected from the group consisting of fluorine, chlorine, bromine, iodine, alkoxy radicals, dialkyl amine radicals, and mercapto radicals, wherein the alkyl radical has from 1 to 20 carbon atoms, which comprises mixing together GeX$_4$ and NQY, where Y is selected from the group consisting of H$_2$, Ge/2, and GeX$_2$.

5. Process for the preparation of Ge[(NQ)$_{1/2}$]$_x$X$_y$ where $x$ and $y$ are numbers greater than zero, and less than 4, and where $x+y=4$, Q is a hydrocarbyl radical from 1 to 20 carbon atoms, X is selected from the group consisting of fluorine, chlorine, bromine, iodine, alkoxy radicals, dialkyl amine radicals, and mercapto radicals, wherein the alkyl radical has from 1 to 20 carbon atoms, which comprises mixing together a germanium compound GeX$_4$ together with an alkylamine QNH$_2$ at from −80° C. to +250° C.

6. Process for the preparation of compounds having a formula

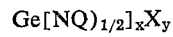

where $x+y=4$, Q is a hydrocarbyl radical of from 1 to 20 carbon atoms, X is selected from the group consisting of fluorine, chlorine, bromine, iodine, alkoxy radicals, dialkyl amine radicals, and mercapto radicals, wherein the alkyl radical has from 1 to 20 carbon atoms, which comprises mixing together a germanium compound having the fromula Ge(NQ)$_2$, together with GeX$_4$ at a temperature of from −80° C. to 250° C.

7. Process for the preparation of compounds having the formula Ge[(NQ)$_{1/2}$]$_x$X$_y$ where $x+y=4$, Q is a hydrocarbyl radical from 1 to 20 carbon atoms, X is selected from the group consisting of fluorine, chlorine, bromine, iodine, alkoxy radicals, dialkyl amine radicals, and mercapto radicals, wherein the alkyl radical has from 1 to 20 carbon atoms, which comprises mixing and heating together as germanium compound having the formula

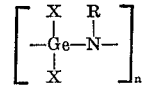

together with GeX$_4$ at temperatures from −80° C. to +250° C. and thereafter separating the

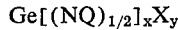

8. Process for the preparation of

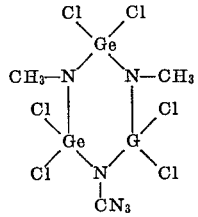

which comprises mixing and heating together 1 mole proportion of GeCl$_4$ in the presence of a solvent with 3 mole proportions of CH$_3$NH$_2$, and thereafter separating the product.

9. Process for the preparation of

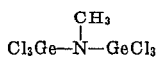

which comprises mixing together and heating together one molar proportion of GeCl$_4$ with 0.36 molar proportion of CH$_3$NH$_2$, thereafter separating the product.

10. Process for the preparation of

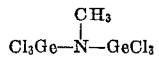

which comprises mixing together and heating together about 20 molar proportions of GeCl$_4$ with 1 molar proportion of (Cl$_2$GeN—CH$_3$)$_3$, and thereafter separating the product.

References Cited

UNITED STATES PATENTS 2,579,418  12/1951  Cheronis _____ 260—2
3,393,218   7/1968  Van Wazer et al. ___ 260—448.2

OTHER REFERENCES

Thomas et al.: Chem. Abst., vol. 25, p. 5662 (1931), Abstract of J. Chem. Soc., 1931, pp. 2083–97.

TOBIAS E. LEVOW, Primary Examiner

A. P. DEMERS, Assistant Examiner

U.S. Cl. X.R.

260—2, 999

PO-1050
(5/69)

UNITED STATES PATENT OFFICE
CERTIFICATE OF CORRECTION

Patent No. 3,487,096      Dated   December 30, 1969

Inventor(s)   Wolfgang H. Eisenhuth et al

It is certified that error appears in the above-identified patent and that said Letters Patent are hereby corrected as shown below:

Column 1, line 17, "(NQ" should be "(NQ)".

Column 2, line 70, right-hand bottom section of formula should read

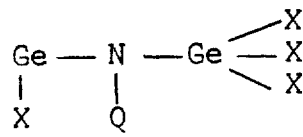

Column 6, line 70, the formula "$CN_3$" should be "$CH_3$".

Signed and sealed this 7th day of September 1971.

(SEAL)
Attest:

EDWARD M. FLETCHER, JR.          ROBERT GOTTSCHALK
Attesting Officer                Acting Commissioner of Patents